(12) United States Patent
Tehranchi et al.

(10) Patent No.: US 6,873,435 B1
(45) Date of Patent: Mar. 29, 2005

(54) PRINT HAVING ENCODED METADATA COUPLED THERETO

(75) Inventors: Babak Tehranchi, Rochester, NY (US); Seung H. Baek, Pittsford, NY (US); Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 760 days.

(21) Appl. No.: 09/640,972

(22) Filed: Aug. 17, 2000

(51) Int. Cl.[7] .................................................. H04N 1/40
(52) U.S. Cl. ........................ 358/1.9; 358/468; 358/470; 382/317
(58) Field of Search ................................ 358/468, 470, 358/440, 1.9, 1.1; 382/317

(56) References Cited

U.S. PATENT DOCUMENTS

| | | | |
|---|---|---|---|
| 4,641,347 A | 2/1987 | Clark et al. | |
| 4,951,086 A | 8/1990 | Hicks | |
| 5,023,656 A | 6/1991 | Terashita | |
| 5,157,726 A | 10/1992 | Merkle et al. | |
| 5,288,977 A | 2/1994 | Amendolia et al. | |
| 5,389,771 A | 2/1995 | Amendolia | |
| 5,486,686 A | 1/1996 | Zdybel, Jr. et al. | |
| 5,644,408 A | * 7/1997 | Li et al. | 358/468 |
| 5,671,282 A | 9/1997 | Wolff et al. | |
| 5,724,491 A | 3/1998 | Kashihara | |
| 5,754,308 A | * 5/1998 | Lopresti et al. | 358/403 |
| 5,818,966 A | 10/1998 | Prasad et al. | 382/232 |
| 5,905,580 A | 5/1999 | Cok et al. | |
| 6,023,524 A | 2/2000 | Yamaguchi | |
| 6,119,132 A | * 9/2000 | Kuwano | 707/205 |
| 6,426,806 B2 | * 7/2002 | Melen | 358/468 |

FOREIGN PATENT DOCUMENTS

| | | |
|---|---|---|
| EP | 751 672 A2 | 1/1997 |
| EP | 913 989 A2 | 5/1999 |

* cited by examiner

Primary Examiner—Thomas D. Lee
(74) Attorney, Agent, or Firm—Nelson Adrian Blish

(57) ABSTRACT

An output print produced by an image processing apparatus comprising a substrate having an image thereon and a machine readable marking identifying a data source used to process the image provided.

4 Claims, 5 Drawing Sheets

PRINT HAVING ENCODED METADATA COUPLED THERETO

FIELD OF THE INVENTION

This invention generally relates to prints processed by a digital image processing apparatus and methods therefor and more particularly relates to an output print generated from digital data, where encoded metadata identifying a data source and image processing variables is coupled to the output print, and to a method for image processing using such encoded metadata.

BACKGROUND OF THE INVENTION

There can be a considerable amount of information associated with an output image that has been digitally processed and produced on a print by an image processing device. Exemplary types of such information is provided hereinbelow. It is beneficial to have this information integrally coupled to a print and, therefore, readily available for access. This is particularly true for high-quality image prints such as those produced by a digital proofing system, an example of which is the "APPROVAL PS Digital Color Proofing System"™ or "APPROVAL XP/XP4 Digital Proofing System"™ available from the Eastman Kodak Company, located in Rochester, N.Y.

A substantial amount of information can be associated with a print from an imaging system such as a digital proofing system. Output prints from such a system serve as proofs, intended to closely emulate the appearance of a printed output page from a printing press. For a print from such a halftone digital proofing system, because such a system is designed to emulate printing press output, it is important to know the exact conditions under which an image was processed and will be printed. Variables such as dot shape, screen angle, screen ruling, densities of component colors, and dot gain adjustments can be modified for images printed from such systems, depending on corresponding characteristics of the target multi-color printing system that the proofing system is intended to emulate. Because an image is prepared before printing using any one of a number of digital prepress systems (such as for initial scanning, color correction, and imposition), it is also beneficial to identify the specific system or systems on which an image has been processed. It is also useful to identify a filename associated with the image that is reproduced.

For such a proofing system, an image on an output print is carefully analyzed for its overall appearance and color content. Adjustments for improving appearance and color are made based on appearance and color as they appear in the output print. Ideally, a prepress proof is even expected to represent potential problem conditions, such as possible moiré pattern or other imaging anomalies. In practice, the output print from such a system is often used to obtain formal customer approval before an expensive multi-color printing operation is initiated. As part of the requirements for customer approval, it can be important to validate the source of proof data and to identify the precise processing systems and steps employed with this data. This is because the same image data that is used to create a color separation on the digital proof may be used subsequently to produce a printing plate for that same color separation. In fact, in some printing environments, it can be a requirement that the same data used to generate a proof be used to generate a printing plate. It is instructive to note that this same data may be conditioned, that is, the data may be with or without adjustments for known characteristics of an apparatus or output media. For example, different dot gain compensation may be applied to the data when imaged on different devices. Viewed from this perspective, the output print used as a digital proof supports the workflow of a print job during prepress processing stages and through final approval and printing.

For an output print produced from such a digital proofing system, there can be numerous variables associated with the print. With the KODAK APPROVAL PS or XP/XP4 Digital Proofing System noted hereinabove, for example, special Raster Image Processing (or RIP) setup software prompts an operator to enter desired values for screen ruling, screen angles, halftone dot shape, target densities, dot gain characteristics, and other emulation variables. RIP setup software then generates a separate file containing such proofing variables, where this RIP setup file is associated with the image file to be printed.

Thus, considering the overall value of an output print produced on a halftone digital proofing system and considering the complexity of processing and providing such a print to emulate a printing press, it is desirable to couple identifying and processing information to the print. This would be particularly desirable where a print job may be prepared and printed in different locations. For example, prepress work for a periodical may be performed in the State of New York, while final plate preparation and printing take place in the State of California. Under such conditions, image content for a proof may be transmitted electronically from one site to another. It would be useful to provide some method for validating the image source, processing steps, and RIP setup conditions used to prepare a proof, so that the same proof could be readily reproduced, with all desired proofing parameters, at a number of different locations. It would also be useful to authenticate a print, or to provide a method for quickly verifying that two image files are identical, using a form of hash encoding or "digital signature" that is readily accessible on the print itself. Such a method would be especially useful for digital proofing applications, because two proofs could appear identical to the unaided eye, but differ because they were produced with different dot shapes, screen angles, or other variable parameters. Data transmission errors could also cause problems, unless detected using an authentication scheme.

In the information processing arts, information about data, for example information identifying a data source and identifying processing steps carried out on the data, is termed "metadata". For the digital prepress proofing application described above, metadata for the actual image and page data that is reproduced on an output print likewise identifies a data source and processing variables. In a more general way, it should be appreciated that the same type of metadata can be useful if coupled to images in other applications. As examples, images digitally obtained via satellite or aerial apparatus, medical or industrial diagnostic images, or images from oceanographic devices often require additional metadata in order to enable correct interpretation of the image data or printing of an image using such data. Images from such devices, because these images are provided as digital data, can undergo a substantial amount of processing before such images are provided on an output print.

There are a number of conventional methods for recording metadata on RIP setup variables used to prepare a digital proof. In the simplest case, an operator may manually take notes on variable settings used. As another example, to provide metadata on the RIP setup proofing variables used to prepare a specific digital proof, and to provide other identifying information about the proof, conventional proofing systems such as the "APPROVAL PS or XP/XP4 Digital Proofing System" might record key identification and image processing variables on the proof itself, typically printed apart from the image, such as in an extreme corner of a proof sheet. Methods such as these might serve the needs of an observer viewing the proof, but would not easily allow automated methods to facilitate access of this information for display, archiving, or the like. Moreover, such handwritten or printed text message would not provide a means for positively authenticating a print as having been produced by a specific prepress system.

Conventional methods for coupling information about a printed image (that is, metadata) to an output print include providing information on an attached magnetic strip. This solution allows storage of some data, but has inherent disadvantages. For example, magnetically encoded media must be protected from magnets or strong electromagnetic fields. The task of reading information from this type of media requires placing the media, in proper orientation, into a reader device. Moreover, magnetic methods provide no easy way to identify and possibly re-use imaging system settings used for an image, such as for the remote proofing situation outlined above.

Attachment of an electronic memory component to the print substrate has inherent disadvantages when physical connection must be made to the memory component for recording or obtaining metadata stored in the memory component. Connectors add cost and present reliability problems caused by dust and dirt and repeated connection/disconnection duty cycles.

Optical encoding, such as using a bar code, is a familiar method widely used for identifying and tracking items in retail merchandising or shipping applications. Bar codes have also been used for tracking and identifying images. In diagnostic imaging, for example, patient identification information can be optically encoded directly onto a film such as for X-rays, ultrasound, or CAT (Computerized Axial Tomography) scan, as is disclosed in U.S. Pat. No. 5,288,977 (Amendolia et al.) Methods used for providing information with such a diagnostic image include encoding information on the edge of the film substrate containing the image using a bar code or other optical encoding.

Applications in photographic film processing and printing have used optical encoding in various ways for identifying negative frames and exposure conditions. For example, U.S. Pat. No. 5,905,580 (Cok et al.) discloses use of a bar code on a developed negative for frame identification. As another example, prints generated using APS advanced Photo System) technology, such as is provided with KODAK "ADVANTIX"™ film available from the Eastman Kodak Company, can include some limited information, such as date and time data printed on the reverse side of a print. However, other than back-printing of this relatively small amount of text data, other useful information is not encoded onto the print itself. U.S. Pat. No. 5,023,656 (Terashita) discloses imprinting of focus and range distance information as bar code data on the edge of a photographic film to improve negative development quality by a processor, based on this information. Again, however, this information is not provided on the output print itself.

For conventional silver-halide photoprocessing using light-exposure techniques, U.S. Pat. No. 4,951,086 (Hicks) discloses using a separate, marked photographic print having a bar-coding that includes photographic processing information to assist in ordering and processing photographic reprints. This information identifies a photographic print so that its corresponding negative can be located on a specific reel. Bar code information also provides information on exposure settings made on the photoprocessing apparatus in order to create a photographic print such as for color balance and density, and cropping adjustments. An operator can use the bar code information to improve the accuracy of reproduction of a photographic reprint or to serve as a basis for making further exposure or cropping adjustments to improve the look of a photographic reprint to suit a customer.

Bar codes have been used in verification and tracking of paper documents, as is disclosed in U.S. Pat. No. 5,671,282 (Wolff et al.) The Wolff et al. patent provides a method, using bar code or other optical encoding, for authenticating a copy of a document as valid, to help prevent forgery or prevent substitution of an incorrect document (for example, with drug prescriptions). In a similar manner, for an electronic document processing system, where paper documents and their corresponding files can be shared on a network comprising multiple authors and users and may be stored, reprinted, or photocopied on any number of devices, U.S. Pat. No. 5,486,686 (Zdybel, Jr. et al.) discloses the printing of encoded optical data on an electronic document, for purposes of authentication. To validate and qualify a paper document produced by an electronic document processing system, the Zdybel, Jr. et al. patent also discloses use of a printed optical encoding for identifying the specific machine that prints an electronic document and for listing the image rendering characteristics used by that machine.

However, a prepress proof is a different type of document than that contemplated by the Zdybel, Jr. et al. and Wolff et al. patents mentioned above. A preprocess proof is not an original; rather, it is a representation of the desired press output. The primary function of a proof is emulation of a printing press (allowing a close match to a final printed output in terms of color, printing parameters, and even paper stock "look and feel") and its use is as an intermediate product in an overall prepress workflow. However, it would be beneficial to provide, on a prepress proof (as well as on an output image from a diagnostic or aerial photography system), some of the same types of identifying information applied to documents in the Zdybel, Jr. et al. and Wolff et al. disclosures.

Additionally, encryption of bar codes, as disclosed in U.S. Pat. No. 4,641,347 (Clark et al.), provides a method for validating the source and authenticity of an attached document to detect theft or forgery. Positive print authentication for output proofs can have particular value. It is desirable to include information on exactly bow the image is printed such that the image may be easily recreated and tracked through to the printing press. For example, during successive stages in prepress workflow, several output prints can be generated as proofs. To the unaided eye, or to someone not familiar with the detailed history of a specific print job, two proofs, each generated during a different stage, can appear to be identical. Thus it can be seen that the likelihood of confusion could be minimized if there were a convenient method for distinguishing between digital proofs produced using different setup parameters.

U.S. Pat. No. 5,724,491 (Kashihara) discloses the use of bar code optical encoding in prepress applications. In the Kashihara disclosure, a separate command sheet is used during an intermediate step in prepress workflow. The command sheet identifies the intended placement of images for a print job. A prepress operator uses the command sheet for accessing, scanning, processing, and imposing each individual image or text component used, in order to create a printing plate. Bar codes on the command sheet provide an operator with an automated method for accurate image identification and placement, such as would be required when creating a proof or a printing plate. Notably, the bar code disclosed in the Kashihara patent prints as an overlay to each image component on a separate layout paper or command sheet, intended for use by an operator when preparing printing plates. Images printed on the command sheet are not intended to emulate final printed color or appearance; rather, the images are typically at low-resolution, intended "for position only". Moreover, any output proof generated using such a method would not include identifying information provided by these temporary bar codes. That is, metadata about the print itself, which would be useful to anyone examining the print, does not appear on the output print.

Thus, it can be seen that while there have been methods for coupling information to individual images and graphical components and for tracking and validating documents, conventional approaches are lacking in addressing the long-felt needs and specific requirements for processing, accurate analysis, and positive verification of digitally processed prints such as are provided from a digital proofing system.

SUMMARY OF THE INVENTION

It is an object of the present invention to provide, from an image processing apparatus, an output print generated from digital data, where encoded metadata identifying a data source and image processing variables is coupled to the output print, and to provide a method for image processing using such encoded metadata.

An output print produced by an image processing apparatus comprising a first machine-readable marking coupled to the output print, where said first machine-readable marking identifies a data source for the output print; and a second machine-readable marking coupled to the output print, where said second machine-readable marking identifies at least one processing parameter employed by the image processing apparatus to produce the output print from said data source.

A feature of the present invention is the provision of a marking, coupled to the print itself, that encodes data source and processing information specific to an output print, where the marking can be read using a standard scanner device for accessing the metadata.

An advantage of the present invention is that it provides a method for identifying a digital image and for distinguishing one digital image from another, where there may be differences in processing between two digital images that otherwise appear to be the same. As a result, the present invention allows an automated method for positive verification of an output print.

A further advantage of the present invention is that it provides a method for positive verification of a digital image file, to help prevent substitution of an incorrect file or use of a file that has been incorrectly processed.

Advantage of the present invention is that it provides a method for remotely processing and printing an output print at two different locations using identical processing variables.

These and other objects, features, and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

In the following description, the term "metadata" is used in its conventional sense as is well known in the data processing art and refers to information about an output print, including information on the image data used to generate the print.

An output print, as the term is used herein, is a print that is generated from a data source. Data from the data source, typically provided as a digital file, is input to an image processing system which processes and produces the output print. In a preferred embodiment of the present invention, output prints are produced from a digital proofing system. Output prints could alternately be produced by other types of imaging systems that process digital images from a data source, such as for aerial photographs or diagnostic images.

Figure 1:
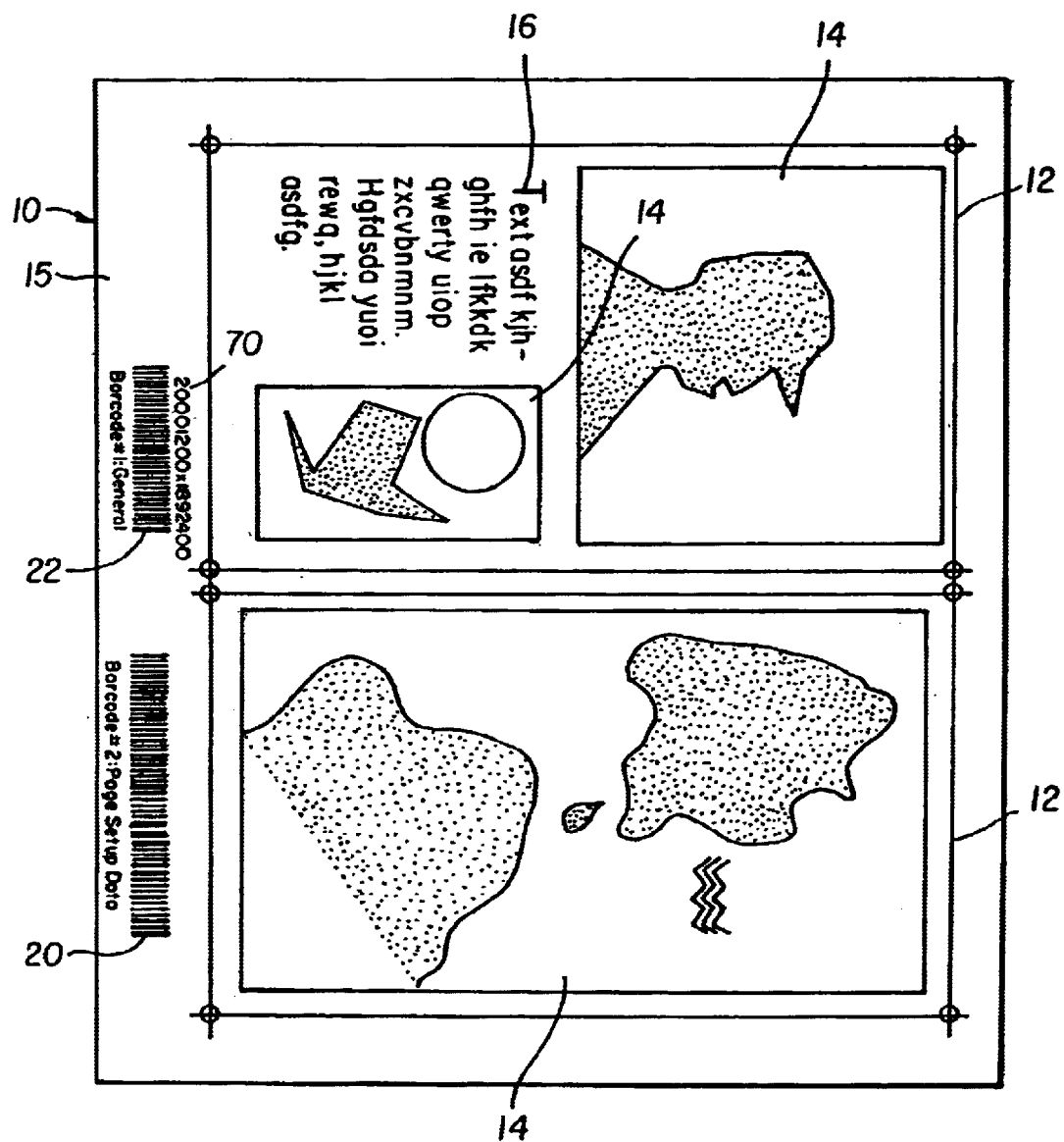
FIG. 1 is a plan view of a proof sheet output from a digital proofing system, the proof sheet containing bar code markings.

Referring to FIG. 1, there is shown an output print 10 from a digital proofing system in the preferred embodiment. Output print 10, which includes a substrate 15, serves as a digital proof, typically having one or more pages 12, each page 12 comprising visual elements such as graphics 14 and text areas 16. Output print 10 includes a RIP setup bar code 20 that stores encoded information on the setup parameters that describe the printing conditions that output print 10 is intended to emulate. A data source identification bar code 22 stores, as metadata, encoded information identifying the digital file used as the source of the image data for output print 10.

Figure 2:
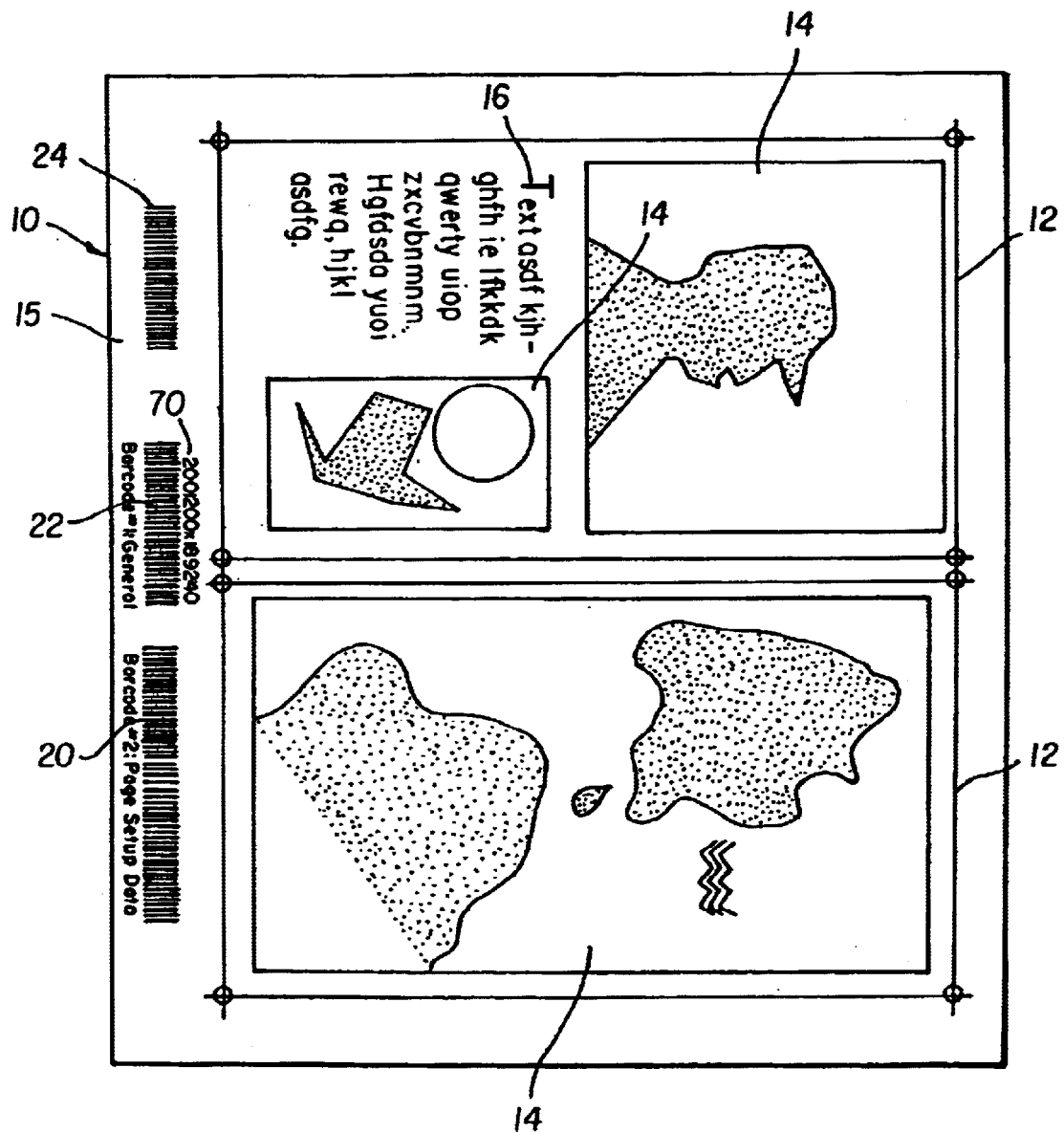
FIG. 2 is a plan view of an alternate embodiment of a proof sheet output from a digital proofing system, the proof sheet containing bar code markings.

As best seen in FIG. 2, in addition to RIP setup information, there can be additional metadata for output print 10 that is printed as a proof. This additional metadata can include, for example, information on environmental conditions under which the proof was prepared and physical characteristics of the proof. Such additional metadata couldbe represented in RIP setup bar code 20 printed on output print 10 or could alternately be printed as a separate physical characteristics bar code 24.

Referring to FIGS. 1 and 2, bar codes 20/22/24 are preferably coupled to output print 10 by being printed directly onto output print 10. This method eliminates manual handling and possible error in attachment of bar code 20/22/24 to output print 10. However, an alternative method could be to print bar code 20/22/24 using a separate printing operation or printer, and then to affix bar code 20/22/24 to output print 10, such as by using an adhesive label.

Figure 3:
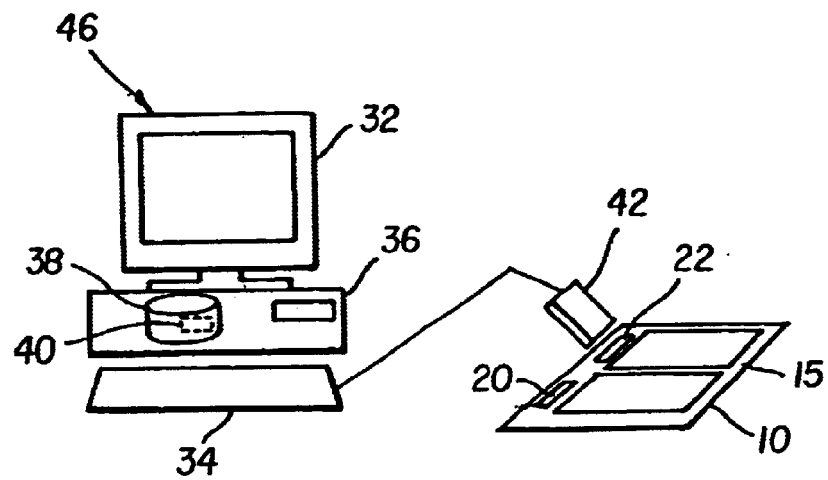
FIG. 3 is a view in perspective of apparatus used for reading and storing bar code markings.

Referring to FIG. 3, there is shown a prepress workstation 46 adapted to read RIP setup bar code 20 and data source identification bar code 22 (and, alternately, physical characteristics bar code 24) on output proof 10. Workstation 46 is a personal computer, for example, a desktop computer with Windows NT™ operating system, in the preferred embodiment. Windows NT™ is a trademark of Microsoft Corporation located in Redmond, Wash. Workstation 46 includes a monitor 32 and a keyboard 34 that provide an operator interface for command entry and for reporting data obtained from bar codes 20 and 22 (and, optionally, bar code 24). A control logic processor 36 includes a storage unit 38 that stores the data obtained from bar codes 20/22/24 as a RIP setup file 40. It is important to distinguish RIP setup file 40, typically an ASCII text file as described presently, from the image data file that is the data source for output print 10. RIP setup file 40 is metadata. On the other hand, the data source, is typically a separate raster image file, which can be very large by comparison to RIP setup file 40.

Referring again to FIG. 3, workstation 46 also comprises a bar code; reader 42. Bar code reader 42 can have any of a number of possible interface arrangements. In the preferred embodiment, bar code reader 42 is a Wasp Bar Code CCD Scanner™, model number UF-101A, manufactured by Informatics, Inc., headquartered in Plano, Tex. Bar code reader 42 connects to workstation 46 by means of a connection to keyboard 34. Alternate connection to workstation. 46, such as by using a serial or parallel interface port on control logic processor 36, is also possible. Alternate reading apparatus for bar code 20/22/24 or its associated text can also include a standard flatbed (platen-based) scanner, configured to read bar code 20/22/24 and related information directly from an output print.

Figure 4:
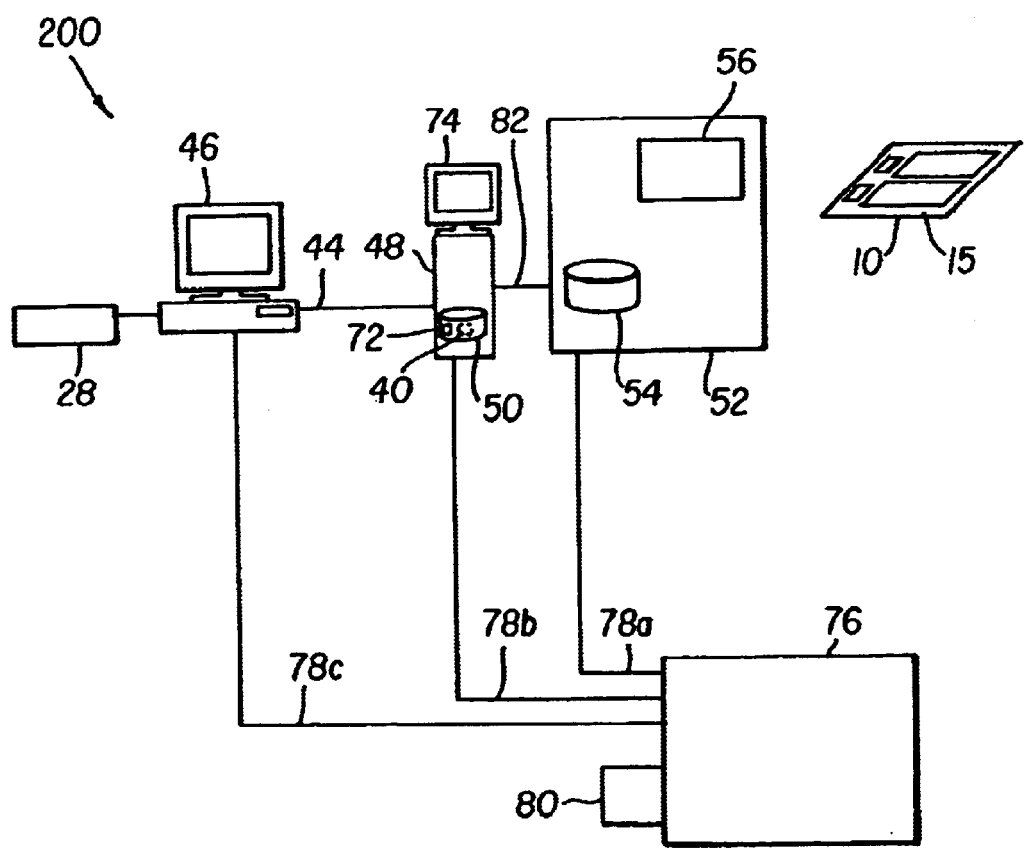
FIG. 4 is a view in elevation showing the utilization of a bar code marking in the overall prepress workflow.

Referring to FIG. 4, there is shown a digital proofing apparatus 200 comprising a configuration of equipment used for digital prepress and proof production. An operator uses software running on prepress workstation 46 that is configured to prepare and process a page for color printing. Original images are input to workstation 46 by devices such as a scanner 28. On workstation 46, an operator performs operations such as image cropping, color manipulation, and imposition (or page composition) to prepare a print job, such as is well known in the digital prepress art. When an assembled page is ready for proofing, the page is sent over a network connection 44 as a digital image file 72. A typical file format for image file 72 is Adobe PostScript format, as is well known in the digital prepress art.

Referring again to FIG. 4, a Raster Image Processor, or RIP, 48 accepts image file 72 as the data source for final rasterization and printing operations. RIP 48 stores image file 72 on a RIP storage device 50, typically a hard disk. For image files 72 in Adobe PostScript™ format, RIP 48 could be, for example, a RIP HQ-1, sold by Kodak Polychrome Graphics, headquartered in Norwalk, Conn.

RIP 48 rasterizes image file 72 and transmits the rasterized data for printing to a printer 52. Typically, the rasterized data is provided one color separation at a time, in sequence, as process colors C, M, Y, K (cyan, magenta, yellow, black) plus any special colors required for the page. Printer 52 may store the rasterized separations internally, on a printer storage device 54, which is typically a high-capacity hard disk. A print engine 56 then generates output print 10 using the rasterized separations. RIP 48 uses a set of setup parameters to control the generation of rasterized separations. These RIP setup parameters determine how output print 10 will emulate its intended printing press. An operator can enter these RIP setup parameters using a user interface on prepress workstation 46 or, alternately, on a RIP interface terminal 74 as shown in FIG. 3. RIP 48 stores RIP setup parameters as RIP setup file 40.

Still referring to FIG. 4, it can be seen that digital proofing apparatus 200 may also comprise a finishing apparatus such as a laminator 76 that applies a laminate media 80 onto output print 10. It should be noted that laminator 76 is an optional device and could be incorporated as an integral component of printer 52. However, in a preferred embodiment, laminator 76 is a separate component of digital proofing apparatus 200. In any event, laminator 76 can be adapted to communicate with either printer 52 by means of a laminator transmission link 78a, or with RIP 48 by means of a laminator transmission link 78b, or with prepress workstation 46 by means of a laminator transmission link 78c. Laminator transmission links 78a/b/c can be implemented using a standard data interface connection, such as, for example, an RS-232C serial connection. Or, laminator transmission link 78a/b/c can be implemented using some other communication means such as infrared communications, high-frequency communications, including RF communications, or other suitable means for data interchange between devices. Laminator transmission links 78a/b/c provides another possible source of information that can be encoded onto, or coupled with, output print 10. As is described presently, data related to settings, equipment type, and operation of laminator 76 can include useful information for output print 10 identification and assessment.

Data Contents and Arrangement for Bar Codes 20, 22, and 24

As noted earlier, output print 10 may be a digital proof produced with the goal of emulating a specific printing press and press conditions. Using software on prepress workstation 46 or running on RIP 48 and accessed using RIP interface terminal 74, a specific set of setup parameters is generated for preparing a digital proof. In a preferred embodiment, RIP setup bar code 20 is used to encode, in compact form, the RIP setup parameters used to generate output print 10. For this RIP setup parameter storage and storage of other data, bar codes 20/22/24 can employ a standard encoding, such as Code 128 encoding, known in the bar code encoding art. Code 128 encoding allows storage of the complete 128 ASCII character set as 8-bit data bytes and is thus easy to use and to adapt to a character-based file format. For compactness of encoding, the preferred embodiment uses Code 128 encoding, then utilizes one or more bits within each data byte to store RIP setup parameter settings.

By way of example only, and not by way of limitation, the metadata represented in RIP setup bar code 20 coupled to output print 10 used as a digital proof may be any of the exemplary data displayed in Table 1 hereinbelow.

TABLE 1

Exemplary RIP setup Bar Code 20 Data Structure, Using Code 128 Encoding

| Field Name of Data Represented | Length (bits) | Options/Range (Description) |
|---|---|---|
| Barcode ID | 2 | 1 of 4 |
| Orientation | 2 | 0,90,180,270 degrees |
| Mirrorprint | 1 | True/False |
| Requiresscreens | 1 | True/False |
| RequiresUCRtrap | 1 | True/False |
| Negativeprint | 1 | True/False |
| Separations | 1 | True/False |
| Trimpage | 1 | True/False |
| Separationison | 1 | True/False |
| Defaultfrequency | 8 | 0 to 255 |
| Overridefrequency | 1 | True/False |
| Defaultsscreenname | 4 | Dot shape: Round, Euclidean, Elliptical1, Elliptical2, EllipticalQ1, EllipticalQ2, Line, Line90, Square1, Square2, EllipticalP, Rhomboid, Other |
| OverrideSpotfunction | 1 | True/False |
| Overridescreenangles | 1 | True/False |
| Screenextragrays | 1 | True/False |
| Limitgraylevel | 3 | 128, 256, 512, 1024, 2048, 4096 gray levels |
| Accuratescreens | 1 | True/False |
| Screenrotate | 1 | True/False |
| Screenangles | 4 | 0, 7.5, 15, 22.5, 30, 37.5, 45, 52.5, 60, 67.5, 75, other |
| Screenanglessnap | 1 | True/False |
| Screenangleaccuracy | 10 | 0.000 to 0.999 |
| Screenfrequencyaccuracy | 10 | 0.000 to 0.999 |
| Screenzeroadjust | 9 | −0.255 to +0.255 |
| Screenfrequencydeviation | 9 | −0.255 to +0.255 |
| Screenwithintolerance | 1 | True/False |
| Limitscreenlevel | 3 | 1024, 2048, 4096, 8192, 16384, 32768, 65536, Other |
| Screendotcentered | 1 | True/False |
| HPS+ | 1 | True/False |
| Oversize | 2 | Crop top and right, crop center, scale to fit, other |
| Rotate | 1 | True/False |
| Extra2density | 8 | −100 to +22 density increments |
| Extra1density | 8 | −100 to +22 density increments |
| Blackdensity | 8 | −100 to +22 density increments |
| Yellow2density | 8 | −100 to +22 density increments |
| Magentadensity | 8 | −100 to +22 density increments |
| Cyandensity | 8 | −100 to +22 density increments |

The set of RIP setup parameters as outlined in the example of Table 1 can be properly formatted to produce RIP setup file 40, which can then be used by RIP 48 software. RIP setup file 40 can use the same data arrangement as listed in Table 1 to store the encoded information in ASCII character format, for example. The Table 1 data would then generate an ASCII file with RIP setup information occupying as few as 17 bytes.

By way of example only, and not by way of limitation, additional metadata on environmental conditions and physical characteristics, encoded in bar code 24, may be any of the exemplary data displayed in Table 2 hereinbelow.

TABLE 2

Exemplary Physical Characteristics Bar Code 24 Data Structure, Using Code 128 Encoding

| Field Name or Data Represented | Length (bits) | Options/Range (Description) |
|---|---|---|
| PaperStock | 16 | Encoding for paper type used. |
| EnvironmentalConditions | 40 | Encoding for ambient conditions under which print produced (for example, temperature, RH). |
| Donor batch | 64 | Encoded batch number for donor media used. |
| Receiver batch | 24 | Encoded batch number for receiver media used. |
| PrinterModel and Serial Number | 128 | Type of printer and encoded serial number. |
| Laminator 76 Model and Serial Number | 64 | Type of laminator 76 to be used and its encoded serial number. |
| Laminator 76 Settings | 24 | Encoded laminator 76 settings data (heat, pressure). |

The set of environmental and physical characteristics as outlined in the example of Table 2 can be entered manually by an operator at either prepress workstation 46 or at RIP interface terminal 74. Or, information can be obtained in an automated manner, such as over laminator transmission link 78a/b/c, or obtained from printer 52 over printer transmission link 82, for example. The set of environmental and physical characteristics as outlined in the example of Table 2 can be stored as part of RIP setup file 40 or in another file associated with RIP setup file 40. RIP setup file 40 can use the same data arrangement as listed in Table 1 to store the additional encoded information from the Table 2 data in ASCII character format, for example. The Table 2 data would add 45 ASCII characters (bytes) in length to RIP setup file 40, in addition to the data listed in Table 1. It should be noted that the preferred embodiment combines the Table 2 environmental and physical data with the Table 1 RIP setup data in RIP setup file 40 and encodes the combined Table 1 and Table 2 data in a single RIP setup bar code 20. However, an alternate arrangement with a separate bar code 24 (as in the example of FIG. 6) could also be used.

By way of example only, and not by way of limitation, the metadata represented in data source identification bar code 22 coupled to output print 10 used as a digital proof may be any of the exemplary data displayed in Table 3 hereinbelow.

TABLE 3

Exemplary Data Source Identification Bar Code 22 Data Structure, Using Code 12 Encoding

| Field Name of Data Represented | Length (bits) | Options/Range (Description) |
|---|---|---|
| Barcode ID | 2 | 1 of 4 |
| Filename (complete print) | 128 | Up to 16 characters (with no file extension). Unique identifier for the print (may be encoded). |
| Filename(s) for each graphics 14 and text area 16 component | 128 (each) | Each filename is up to 16 characters (with no file extension). Variable number, depending on number of components on the print. |
| Date stamp(s) | 20 | yyyy-mm-dd encoding. Arranged so that each Filename for graphics 14 and text area 16 component has separate date stamp. |
| Time stamp | 20 | hour:min:sec encoding. Arranged so that each Filename for graphics 14 and text area 16 component has separate time stamp. |
| Image processing software ID | 128 | Name and version of prepress software used for images and overall print. |

The set of setup parameters as outlined in the example of Table 3 can be stored together, either included as part of RIP setup file 40 or as a separate file. Similarly, RIP setup file 40 can use the same data arrangement as listed in Table 1, Table 2, and Table 3 to store encoded information in ASCII character format, for example. The combined Table 1, Table 2, and Table 3 data (in a simple example) would then generate an ASCII file that could store Table 1, 2, and 3 information in fewer than 200 characters (bytes).

Hash Functions, Encryption, or Digital Signature

In addition to the identification and processing data as described in Tables 1 and 2 above, bar codes 20, 22, or 24 could also incorporate a hash function or similar data-checking routine for print authentication. A hash value, such as the one generated by MD2 or MD5 algorithms, using encoding techniques well known in the digital file transmission art, would provide a tool for verifying that the content of one image file 72 is identical to the content of another image file 72. (MD denotes Message Digest algorithms, licensed from RSA Data Security, Inc. located in Bedford, Mass.)

Where a more secure authentication scheme is needed (such as to prevent a transmitted image file 72 from being appropriated by an unauthorized party), a "digital signature" or "digital fingerprint" can be computed using techniques well known in the digital file transmission art. In general, computation of a digital signature is more complex than computation of a hash function. A digital signature could be generated by further encoding of a hash function, for example. Such a digital signature could be generated based on data in the image file used for printing and, possibly, also based on related data such as RIP setup processing variables, date/time stamp, or originating system identification. The digital signature could then be encoded as part of bar code 20/22/24.

Applications in Remote Proofing

Figure 5:
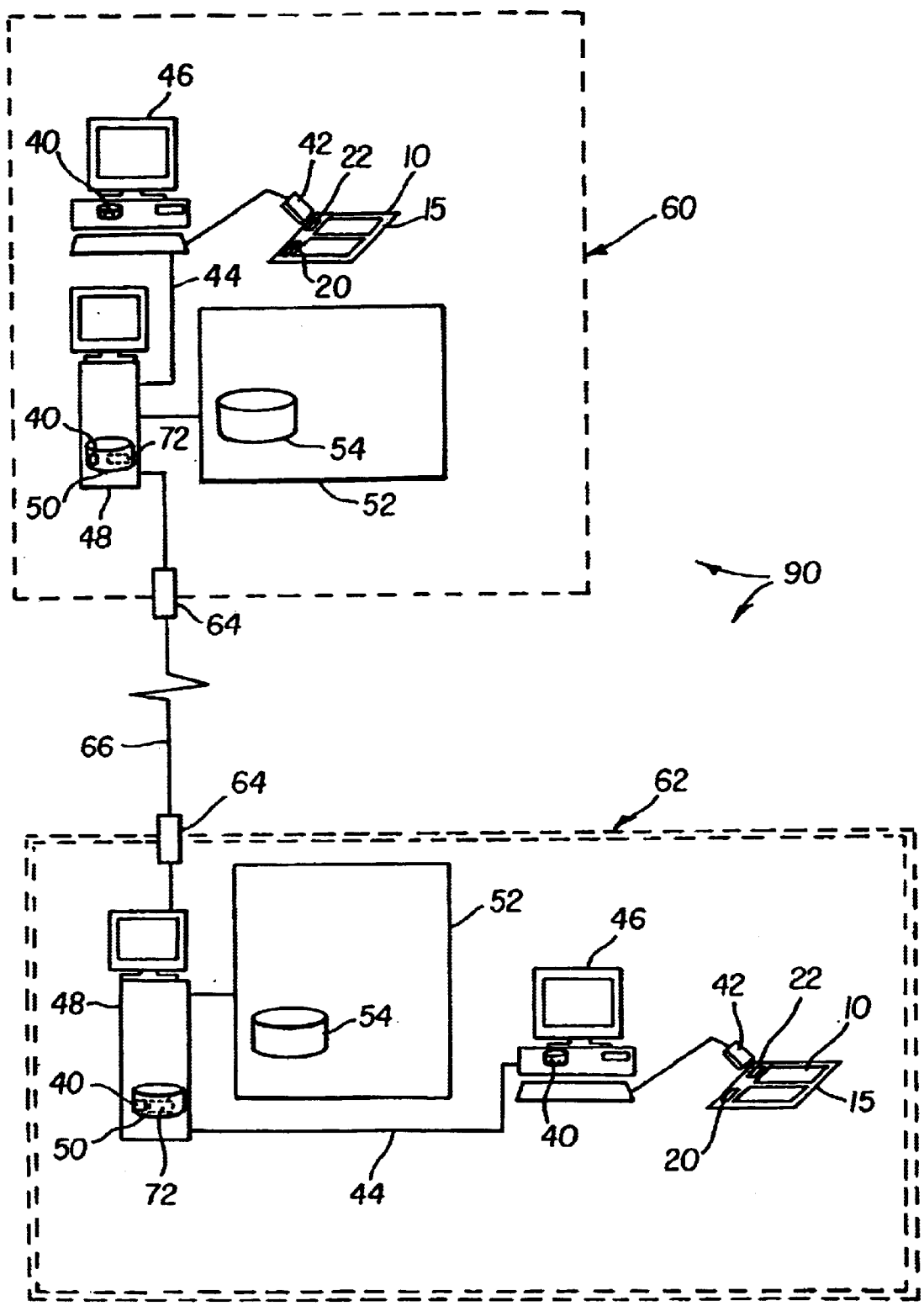
FIG. 5 is a view in elevation showing the print of the present invention in a remote proofing application.

Referring to FIG. 5, there is shown an arrangement of a remote proofing system, generally numbered 90 in which digital output print 10 may be processed and printed at two different geographical locations. Output print 10 is originally generated at a local prepress site 60 (bounded by a single dashed line in FIG. 4). To generate output print 10, RIP 48 processes image file 72 along with RIP setup and identification data from bar codes 20 and 22 (and, optionally, from bar code 24). In a preferred embodiment, the source image file 72 is a PostScript™ file.

As is shown in FIG. 4, local prepress site 60 comprises a RIP 48 and a printer 52, with the necessary support components for generating output print 10. Local prepress site 60 communicates with a remote prepress site 62 (bounded by a double dashed line in FIG. 5) at another location, over a transmission link 66. Modems 64 or equivalent networking apparatus provide an interface to transmission link 66 for both local site 60 and remote site 62. The arrangement of FIG. 5 allows the same image file 72 to be transmitted and independently processed by RIP 48 at each site 60 and 62 respectively.

Referring again to FIG. 5, both local and remote sites 60 and 62 also comprise prepress workstation 46 with bar code reader 42. Parameters under which output print 10 is printed and data source identification are encoded in bar codes 20 and 22 (and optionally in bar code 24), as was described above.

Referring again to FIG. 5, bar codes 20 and 22 (and, optionally, bar code 24) provide a means for verifying that output prints 10 printed at multiple sites use the same data source and have been printed using identical parameters. Prepress production personnel who independently examine output prints 10 at each site can communicate with each other about output print 10 content, confident that both sites 60 and 62 have produced output print 10 having substantially the same appearance. With this arrangement, for example, decisions on the suitability of printing parameters applied to a page can be made where output print 10 is examined for customer approval at remote site 62 and the final print job is to be printed at local site 60.

The arrangement of FIG. 5 allows a number of methods for sending RIP setup metadata (as exemplified in Table 1 and encoded in RIP setup bar code 20) and data source identification metadata (as exemplified in Table 3 and encoded in data source identification bar code 22) as well as physical characteristics data (as exemplified in Table 2 and encoded in physical characteristics bar code 24) between local prepress site 60 and remote prepress site 62. This metadata could be sent over transmission link 66 as RIP setup file 40. RIP setup file 40 would then be incorporated into output print 10 by RIP 48 when RIP 48 processes image file 72.

Alternately (where only image file 72 for output print 10 is sent over transmission link 66), bar codes 20 and 22 (and, alternately, bar code 24) could be photocopied and faxed from local site 60 to remote site 62 and processed by RIP 48 at remote site 62 for processing the image data. Or, the complete image, including embedded bar codes 20 and 22 (and optionally bar code 24) can be sent using the fax link mechanism.

Or, because bar codes 20 and 22 (and, alternately, bar code 24) can also incorporate an accompanying human-readable numeric or alphanumeric string 70 (see FIG. 1) that encodes the same data, operators at sites 60 and 62 could simply read numeric or alphanumeric string 70 to exchange RIP setup and data source information and, using string 70, could manually enter setup data for RIP 48 processing, creating RIP setup file 40 using an interface provided by prepress workstation 46. The preferred embodiment, using Code 128 encoding, provides alphanumeric characters with each bar code 20/22/24, where the characters can be easily read by a human operator.

Figure 6:
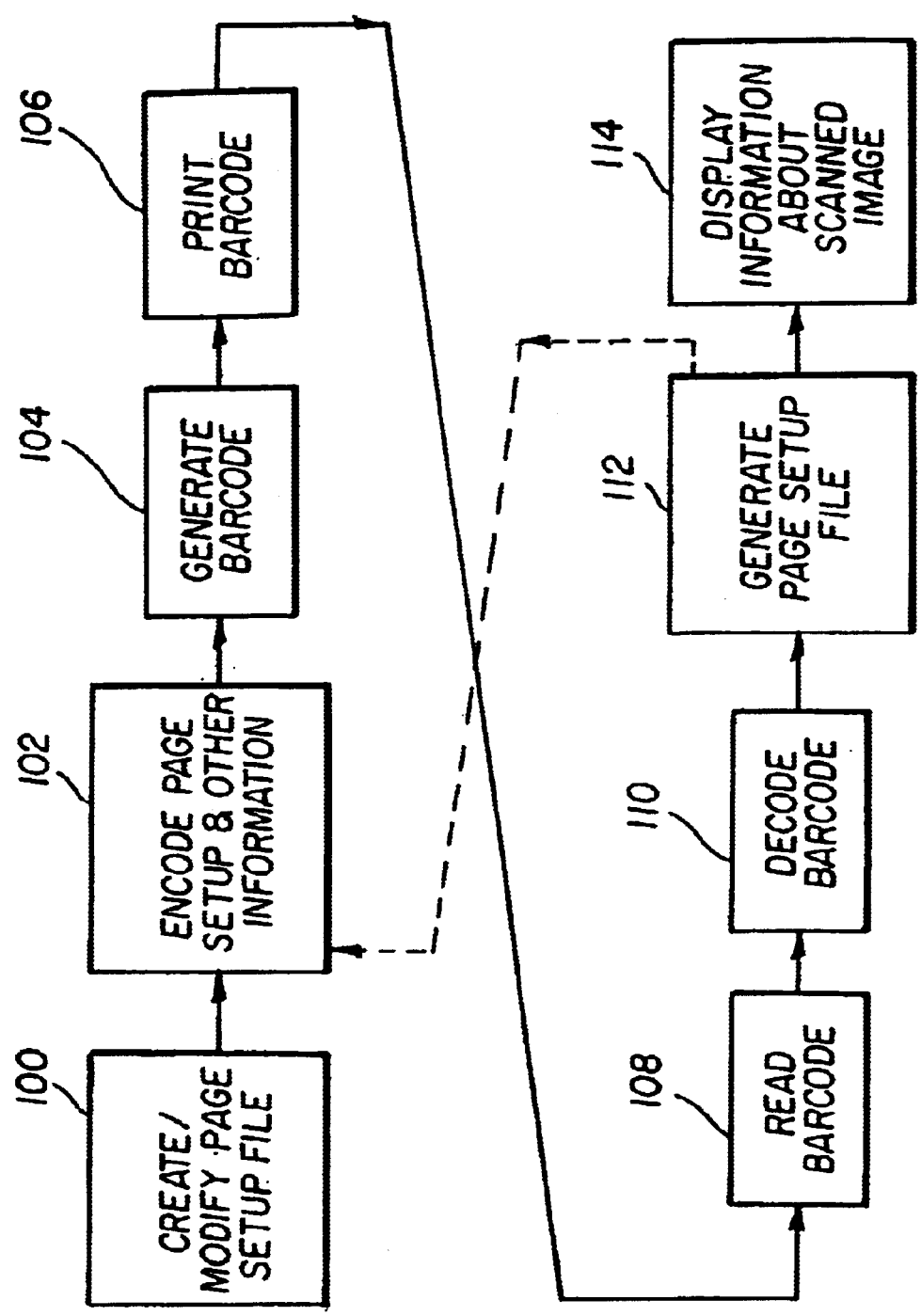
FIG. 6 is a block diagram showing the process by which RIP setup information is stored and retrieved using a bar code marking.

FIG. 6 shows a process flow for generating bar codes 20 and 22 (and, alternately, bar code 24) and using them for the remote proofing application shown in FIG. 5 and, more generally, for verification of output print 10, its RIP setup parameters, and its data source identification. Working on prepress workstation 46 an operator performs a create page setup file step 100 by responding to user interface prompts. Step 100 thus creates RIP setup file 40 for use in output print 10 processing. Prepress workstation 46 then performs an "encode page setup" step 102 by which setup file 40 generated in step 100 is put into encoded form. Step 102 may also include the encoding of data source identification information. Prepress workstation 46 then executes a "generate bar code" step 104 for creating bar codes 20 and 22 (and, alternately, bar code 24) as image files. Then, during processing of output print 10, RIP 48 performs a "print bar code" step 106 in which bar codes 20 and 22 (and, alternately, bar code 24) are incorporated into the output data for processing by print engine 56.

Using bar code reader 42, an operator performs a "read bar code" step 108 in which bar codes 20 and 22 (and, alternately, bar code 24) are read from output print 10. Software on prepress workstation 46 performs a "decode bar code" step 110, in which data from bar codes 20 and 22 (and, alternately, bar code 24) are decoded. Prepress workstation 46 next performs a "generate page setup file" step 112 which recreates a RIP setup file 40 for output print 10. A "display information" step 114 enables prepress workstation 46 to display information read from bar codes 20 and 22 (and, alternately, bar code 24) and relevant to output print 10.

In a remote proofing application, such as that shown in FIG. 5, RIP setup file 40 created at local prepress site 60 can be used to recreate output print 10 at remote prepress site 62. As indicated by the dotted line in FIG. 6, RIP setup file 40 could be alternately processed using steps 102, 104, and 106 to add bar codes 20 and 22 (and, alternately, bar code 24) to output print 10 generated at remote site 62.

Of course, it is instructive to note that FIG. 6 shows a typical sequence of steps for clarification of process flow. In practice, a number of steps could be combined, for example. An operator can scan a bar code 20, 22, or 24 to automatically generate a setup file in step 112, for instance. In addition, the process steps could be modified from those described hereinabove. For example, bar codes 20/22/24 could be printed directly on output print 10 or could be printed separately and then affixed to output print 10.

Metadata As Part Of Bitmapped Image Data

It is significant to note that the output bitmapped data from RIP 48 that goes to printer 52 can include bar codes 22 and 20 (and, optionally, bar code 24) as well as any graphics 14 and text areas 16. In this way, metadata for output print 10 would be encoded as part of the rasterized image data. That is, bar codes 20 and 22 (and, alternately, bar code 24) that are an integral part of the bitmapped color separation data that is output by RIP 48, are stored in printer storage device 54 and is ultimately used for imaging by print engine 56. Because data processed by RIP 48 can be in a format that is proprietary to the manufacturer of printer 52, this can allow a measure of security for the rasterized output image data that is stored on printer storage device 54 and processed by printer 52.

While the invention has been described with particular reference to its preferred embodiments, it will be understood by those skilled in the art that various changes may be made and equivalents may be substituted for elements in the preferred embodiments without departing from the scope of the invention. For example, while the preferred embodiment of the present invention is for output prints used as digital proofs, optical encoding can be employed for other types of images that are stored, processed, and transmitted as digital data, such as satellite images or aerial photographs, medical and industrial diagnostic images, and images from oceanographic apparatus. Also, the present invention would have particular value for images where processing steps that have been used are not intended to be easily discerned by the unaided eye.

As another example, the present invention uses bar codes; however, other methods of optical encoding could be used within the scope of the invention. Encoding could be printed using alternate media, allowing, for example, detection of infrared markings. Reading devices could include any of a number of scanner types, selected for the type of marking detected.

As yet another example, and referring back to FIG. 5, it should be noted that there may be applications in which a bitmapped image is transmitted to remote prepress site 62 from an alternate source, where only partial RIP setup information is provided as RIP setup file 40 along with image file 72. In such an instance, barcodes 20 and 22 (and optionally, bar code 24) may only encode a partial subset of the information that would preferably be provided.

In addition, other types of finishing apparatus could be used, in addition to a laminator. Optional finishing apparatus could include any device that applies a finish coating to output print 10 or mounts output print 10 to a substrate, for example.

Further, a preferred embodiment of the present invention uses two or three separate bar codes. However, multiple bar codes could be used, or a single bar code could be used for the purpose of storing relevant RIP setup and identifying information, within the scope of the present invention.

Moreover, metadata could also be encoded in a bar code or other optical marking and printed on a label that could then be affixed or otherwise coupled to output print 10.

Therefore, what is provided is an output print generated from digital data, where encoded metadata identifying a data source and image processing variables is coupled to the output print, and a method for image processing using such encoded metadata.

| PARTS LIST |
|---|
| 10. Output print |
| 12. Page |
| 14. Graphics |
| 15. Substrate |
| 16. Text area |
| 20. RIP setup bar code |
| 22. Data source identification bar code |
| 24. Physical characteristics bar code |
| 28. Scanner |
| 32. Monitor |
| 34. Keyboard |
| 36. Control logic processor |
| 38. Storage unit |
| 40. RIP setup file |
| 42. Bar code reader |
| 44. Network connection |
| 46. Prepress workstation |
| 48. RIP |
| 50. RIP storage device |
| 52. Printer |
| 54. Printer storage device |
| 56. Print engine |
| 60. Local prepress site |
| 62. Remote prepress site |
| 64. Modem |
| 66. Transmission link |
| 70. Alphanumeric string |
| 72. Image file |
| 74. RIP interface terminal |
| 76. Laminator |
| 78a/b/c. Laminator links |
| 80. Laminate media |
| 82. Printer transmission link |
| 90. Remote proofing system |
| 100. Create page setup file step |
| 102. Encode page setup step |
| 104. Generate bar code step |
| 106. Print bar code step |
| 108. Read bar code step |
| 110. Decode bar code step |
| 112. Generate page setup file step |
| 114. Display information step |
| 200. Digital proofing apparatus |

What is claimed is:

1. A remote proofing system, comprising:

(a) a first printer for printing a first output print having an image thereon, wherein a marking containing metadata describing the image is coupled to said first output print;

(b) a reader for scanning the marking, said reader capable of providing said metadata in a metadata file;

(c) a second printer for printing a second output print, wherein said second printer accepts said metadata file from said reader, said metadata file conditioning the operation of said second printer so that the second output print is substantially identical in appearance to said first output print.

2. An apparatus for comparing output prints produced by image processing apparatus comprising:

(a) a first substrate having a first image thereon;

(b) a first machine readable marking coupled to said first substrate, wherein said first machine readable mark identifies a first data source and processing used to create said first image;

(c) a second substrate having a second image thereon;

(d) a second machine readable marking coupled to said second substrate, wherein said second machine readable mark identifies a second data source and processing used to create said second image;

(e) a first scanner reading said first machine readable mark;

(f) a second scanner for reading said second machine readable mark; and (g) a computer for comparing said second machine readable mark to said first machine readable mark in order to determine that said first and second image are identical.

3. The apparatus as in claim 2 wherein said first image and said second image are located remotely from each other.

4. A method for producing identical images comprising:

printing a first image on a first substrate with a first machine readable mark;

printing a second image on a second substrate with a second machine readable mark;

scanning said first and second machine readable marks; and comparing said first and second machine readable marks to determine if said first and second images are identical.

* * * * *